United States Patent
Hehl

[11] 3,914,082
[45] Oct. 21, 1975

[54] MACHINE BASE FOR INJECTION MOLDING MACHINES

[76] Inventor: Karl Hehl, Siedlung 173, 7291 Lossburg, Wuertt, Germany

[22] Filed: Apr. 18, 1973

[21] Appl. No.: 352,452

[30] Foreign Application Priority Data
Apr. 19, 1972 Germany.......................... 7214780

[52] U.S. Cl................................. 425/192; 425/242
[51] Int. Cl.²............................................ B29F 1/00
[58] Field of Search........... 425/186, 192, 242, 472, 425/450, 242 R; 100/214; 74/608; 312/281, 282

[56] References Cited
UNITED STATES PATENTS

| | | | |
|---|---|---|---|
| 1,769,541 | 7/1930 | Parcell........................ | 312/282 X |
| 2,362,243 | 11/1944 | Chasen et al................. | 312/282 |
| 2,580,078 | 12/1951 | Denison, Jr.................. | 100/231 |
| 2,627,630 | 2/1953 | Farley........................ | 425/450 X |
| 3,221,373 | 12/1965 | Kwan......................... | 425/242 R |
| 3,626,767 | 12/1971 | Wildi......................... | 74/16 |
| 3,674,400 | 7/1972 | Sauerbruch et al............ | 425/242 R |

*Primary Examiner*—Francis S. Husar
*Assistant Examiner*—David S. Safran
*Attorney, Agent, or Firm*—Joseph A. Geiger

[57] ABSTRACT

A machine base for injection molding machines with a horizontally mounted die closing unit and a skid-supported horizontally aligned injection unit connected to the rear of the die closing unit, where the rectangular, block-shaped base is subdivided into a forward compartment for hydraulic controls and a rear compartment forming a tank, the die closing unit being mounted above the controls compartment, and the injection unit being supported by a cover plate on top of the tank compartment. The cover plate forms a rearwardly extending overhang protecting the motor of the hydraulic power unit and serving as a servicing support for the injection unit.

10 Claims, 2 Drawing Figures

MACHINE BASE FOR INJECTION MOLDING MACHINES

BACKGROUND OF THE INVENTION

1. Field of the Invention

The present invention relates to supporting structures for injection molding machines, and in particular to a machine base for injection molding machines which is constructed of steel sheet and where a tank compartment for the hydraulic fluid is built into the machine base.

2. Description of the Prior Art

It is known from the prior art in this field to construct machine bases for injection molding machines from steel sheet. A known version of such a prior art machine base is of a length which extends considerably farther to the rear of the machine than would be required for the mere support of a horizontally arranged injection unit, when the latter is mounted to the rear of the stationary die support of a known die closing unit. One reason for the length of this machine base is the need for a gliding support for the skids of the heavy injection unit which, after disconnection from the cylinder mount of the die closing unit, has to be pulled to the rear, in order to be removed from the machine by means of a powered lifting device. In this case, the drive motor for the pump of the hydraulic system has to be arranged at the inside of the machine base, and the hydraulic fluid tank is arranged in the bottom portion of the machine base.

SUMMARY OF THE INVENTION

It is a primary objective of the present invention to provide a machine base of the earlier-mentioned type which, while meeting the mounting requirements of the prior art base, features a considerable reduction in overall weight and space requirements.

The invention proposes to attain the above objective by suggesting a machine base for injection molding machines where the upper surface of the machine base in the area of the hydraulic tank compartment is provided in the form of a cover plate which reaches rearwardly beyond the hydraulic tank compartment.

In a preferred embodiment of the invention, the hydraulic tank compartment occupies the rear portion of the interior space of the machine base, an intermediate wall forming one side of the hydraulic tank compartment, and the rear wall of the hydraulic tank being also the rear wall of the machine base itself and carrying the hydraulic power unit in a double-flange mount. This double-flange power unit suspension is preferably so arranged that the hydraulic pump is positioned inside the tank compartment, while the electric motor is on the outside of it. (Details of such an arrangement are disclosed, for example, in applicant's co-pending application Ser. No. 322,683, filed Jan. 11, 1973.) The above arrangement of the hydraulic power unit in the rear wall of the machine base offers not only the advantage of reducing the space requirements inside the hydraulic tank compartment, but it also greatly facilitates the cooling of the electric motor by exposing it to the freely circulating ambient air. The rearwardly overhanging cover plate of the machine base thus has the additional advantage of providing a protection for the electric motor, without reducing the cooling possibilities of the latter.

The savings in weight and space requirements of the novel machine base not only reflect themselves in lower production costs by requiring less sheet metal, but also in the cost of machine transportation, especially in the case of air freight.

BRIEF DESCRIPTION OF THE DRAWINGS

Further special features and advantages of the invention will become apparent from the description following below, when taken together with the accompanying drawings which illustrate, by way of example, an embodiment of the invention, represented in the various figures as follows.

DESCRIPTION OF THE PREFERRED EMBODIMENT

Figure 1:
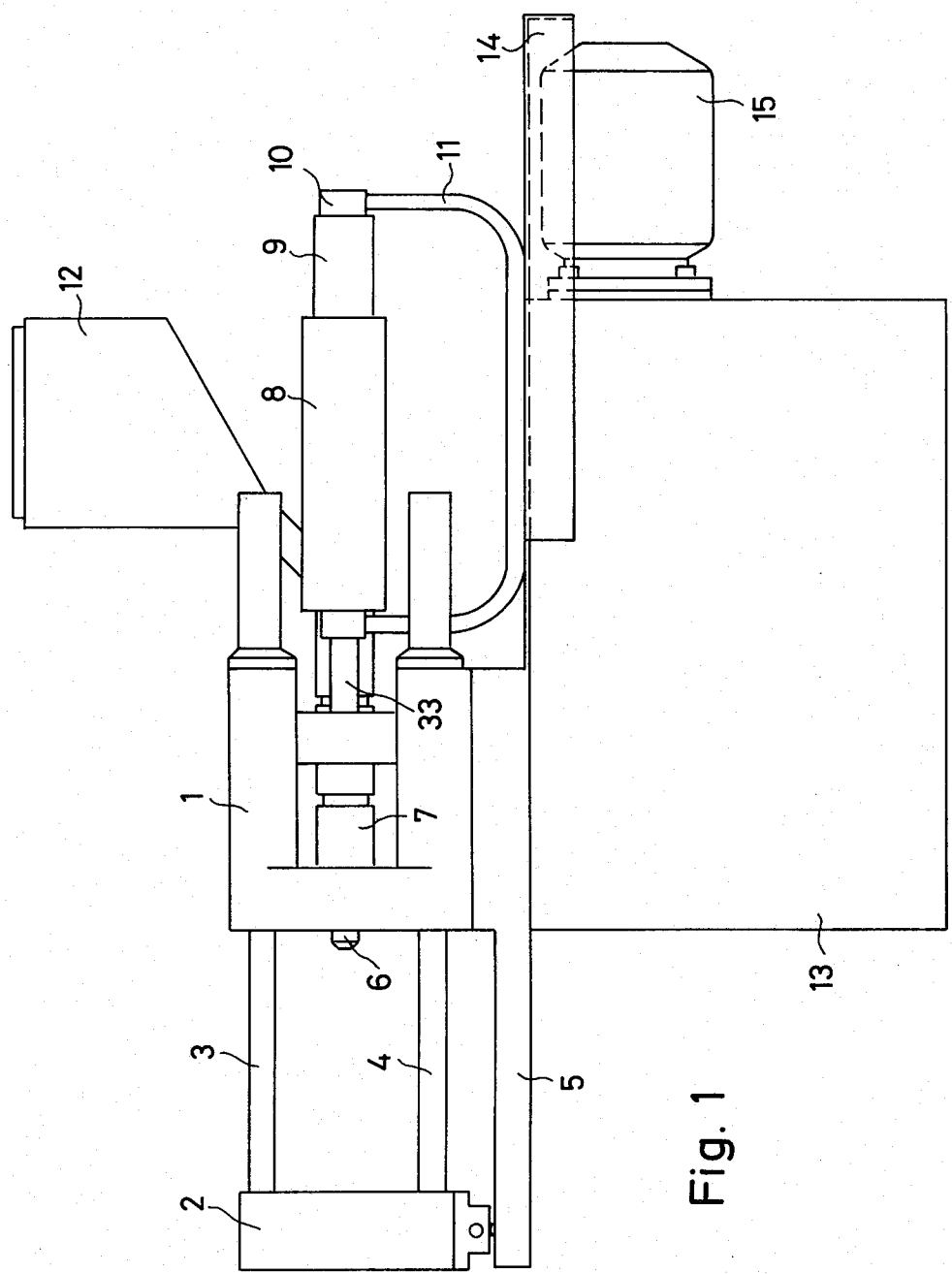
FIG. 1 shows in an elevational front view a machine base embodying the invention, with an injection molding machine (die closing unit and injection unit) horizontally mounted thereon.
Figure 2:
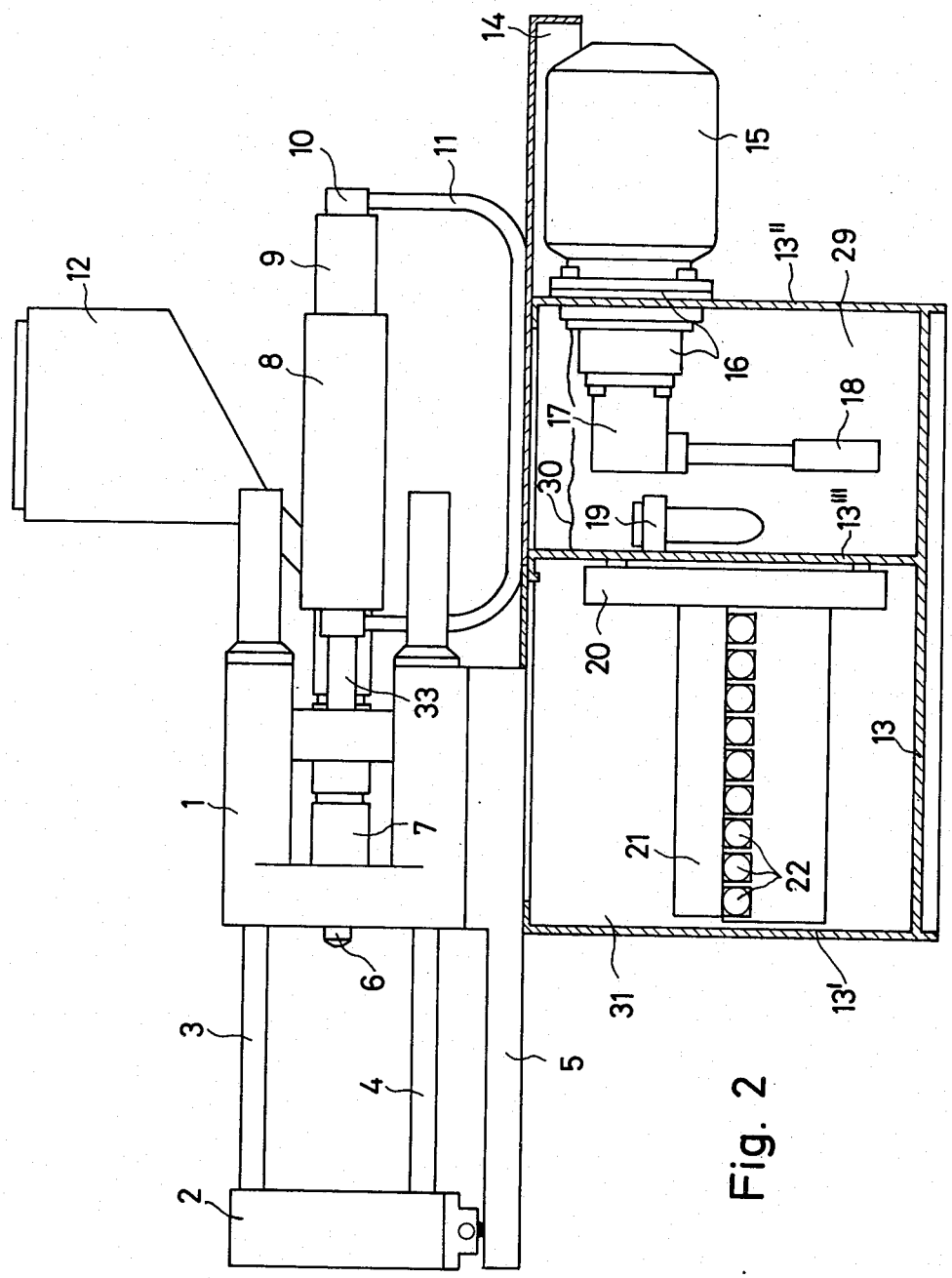
FIG. 2 shows the machine base and injection molding machine of FIG. 1 with the machine base illustrated in a longitudinal cross section.

The machine base 13, as illustrated in FIGS. 1 and 2 of the drawing, has the general outline of a hollow rectangular block. The interior space of this block is subdivided into two compartments by a vertical intermediate wall 13''' which forms one side wall of the tank for the hydraulic fluid of the injection molding machine. The flat horizontal mounting surface of the machine base 13 carries a horizontally mounted injection molding machine whose die closing unit is arranged above the forward portion of the machine base and an injection unit attached thereto and supported by the rear portion of the machine base. The die closing unit in this case includes a stationary die support which is part of the cylinder mount 1, comprising several horizontally aligned die closing cylinders which operate the movable die support 2 attached to the far ends of the piston rods 3 and 4 of the die closing cylinders. A forwardly extending horizontal support frame 5 is positioned intermediate the cylinder mount 1 and the upper surface of the machine base 13 supports and guides the movable die support 2. The cylinder mount itself is positioned flush with the forward wall 13' of the machine base. The injection unit, with its plastification cylinder 7, injection nozzle 6, support arms 8, screw conveyor drive 9, and granulate hopper 12, is removably attached to the cylinder mount 1 by means of horizontal mounting rods 33. The injection unit further includes a pair of skids 11 which support its weight against the upper surface of machine base 13, the ends of the skids being connected to the mounting rods 33 by means of clamping sleeves 10. Following disconnection of the injection unit from the cylinder mount 1, the unit and its mounting rods 33 can be pulled away from the cylinder mount 1 toward the rear of the machine base. For this purpose, the skids 11 are arranged to slide on the upper surface of the machine base. Such maneuvers are necessary, for example, when the plastification cylinder has to be exchanged or when the injection nozzle requires inspection or servicing. For such cases it is necessary to pull the injection unit far enough to the rear of the machine base to completely disengage the injection nozzle 6 as well as the mounting rods 33 from the cylinder mount 1.

As can be seen from the drawings, the upper surface of the machine base does provide the possibility of pulling the injection unit rearward from its mounted position, by extending a distance beyond the normal contact area of the injection unit skids 11. However, the hollow block of the machine base 13 itself is considerably shorter than its upper surface. The rear portion of the space inside the machine base serves as a tank for the hydraulic fluid of the injection molding machine, the tank compartment 29 being defined by the earlier-mentioned vertical intermediate wall 13''' and the likewise vertical rear wall 13'''' of machine base 13. The upper wall of this tank compartment 29 is formed by a removable cover plate 14 which includes the rearwardly overhanging portion serving as an extended supporting surface for the skids 11 of the injection unit. The cover plate 14 is bolted to the machine base and includes reinforced borders in the form of downwardly extending ledges for increased plate stiffness. The lateral ledges of cover plate 14 are positioned on the outside of the side walls of machine base 13, as illustrated in FIG. 1. The plan view area of machine base 13 is larger than the plan view area of the injection molding machine constituted by the cylinder mount 1 and the injection unit 6–12. Because the cylinder mount 1 is arranged in alignment with the front wall 13' of the machine base 13, the additional area of the machine base is available to the rear of the injection unit, as mentioned earlier, for the support of the injection unit when it is pulled away from the cylinder mount. The vertical rear wall 13'' which is an end wall of the machine base 13 as well as of the tank compartment 29, includes a horizontal bore through which extends a double-flange mounting unit 16 carrying the power unit of the hydraulic system of the injection molding machine. This power unit includes a pump unit 17 with an intake pipe and an intake filter 18 on the inside of tank 29 and an electric drive motor 15 on the outside of rear wall 13'' coupled to the hydraulic pump 17 by a shaft which extends through the double-flange mounting unit 16.

The cover plate 14 thus extends above and beyond the electric motor 15, thereby providing a convenient protection for the latter without impeding the flow of cooling air through the motor. The tank compartment 29 occupies the entire height of the machine base 13, the pump unit 17 being immersed in the hydraulic fluid. On the intermediate wall 13''' is further arranged a return flow filter 19 through which the used hydraulic fluid passes into the tank 29. An oil cooler 20 is arranged on the opposite side of intermediate wall 13''' occupying the major part of the forward face of that wall.

The open forward compartment 31 of machine base 13 also serves as a controls compartment, accomodating the hydraulic controls, especially a hydraulic distribution block with a bank of hydraulic control valves 22 mounted on a side wall of the machine base 13, on the side of the base which is opposite the operator's stand. The solenoid-operated hydraulic control valves 22 may be so arranged that their solenoids protrude laterally from the side wall of machine base 13. The upper surface of the open controls compartment 31 is covered in part by the horizontal support frame 5 for the injection molding machine and in part by a cover which is aligned with, but independently mounted from cover plate 14. As can be seen from FIG. 2, this second cover does not support any of the machine components, the die closing unit being supported by the support frame 5, and the injection unit resting on the cover plate 14.

It should be understood, of course, that the foregoing disclosure describes only a preferred embodiment of the invention and that it is intended to cover all changes and modifications of this example of the invention which fall within the scope of the appended claims.

What is claimed is:
1. A machine base for injection molding machines, especially for machines of the type which include a horizontally mounted die closing unit and a skid-supported horizontally aligned injection unit connected to the rear of the die closing unit, comprising in combination:
   a generally rectangular, block-shaped base body which includes a floor panel, generally upright front and rear walls and adjoining side walls, thereby defining a base cavity;
   a tank compartment for hydraulic fluid arranged in the rear portion of the base body, the rear wall of the base also being the rear wall of the tank compartment;
   a horizontal mounting face on top of the forward portion of the base body for the support of the die closing unit; and
   a horizontal cover plate removably mounted on top of the rear portion of the base body for the support of the skids of the injection unit; the cover plate overhanging rearwardly a distance from the rear wall of the base body to form an extended supporting surface for the injection unit, when the latter is moved to the rear, out of engagement with the die closing unit, the cover plate thereby also serving as a cover for the tank compartment.
2. A machine base as defined in claim 1, wherein:
   the cover plate includes a border reinforcement on both of its longitudinal edges and on its overhanging rear edge.
3. A machine base as defined in claim 2, wherein:
   the border reinforcement on the edges of the cover plate is in each case a downwardly extending ledge, the reinforcement ledges on the longitudinal edges of the cover plate being located laterally outside the side walls of the base body.
4. A machine base as defined in claim 1, further comprising:
   a hydraulic power unit with a pump and co-axial electric motor mounted on the rear wall of the base body in such a way that the power unit axis is substantially perpendicular to the rear wall; the pump being located inside the tank compartment, while the electric motor is located behind the rear wall underneath the rearwardly overhanging portion of the cover plate.
5. A machine base as defined in claim 4, wherein:
   the tank compartment includes an upright partition wall located between the front and rear walls of the base body and extending between the side walls of the base body.
6. A machine base as defined in claim 4, wherein:
   the tank compartment occupies the entire height of the machine base, between the floor panel and the cover plate, the pump of the hydraulic power unit being immersed in the hydraulic fluid.
7. A machine base as defined in claim 5, further comprising:

a partially open controls compartment in the forward portion of the base body, the controls compartment occupying that portion of the base cavity which is located between the front wall and the partition wall of the base body.

8. A machine base as defined in claim 7, further comprising:
a return filter for the hydraulic fluid mounted on the tank side of the partition wall; and
a cooler for the hydraulic fluid mounted on the opposite side of the partition wall in the controls compartment.

9. A machine base as defined in claim 7, further comprising:
hydraulic distribution means, including a bank of hydraulic control valves, mounted in the controls compartment on the side wall opposite the side on which the machine operator's is normally positioned.

10. A machine base as defined in claim 9, wherein:
the hydraulic control valves are of the solenoid type and are so arranged in relation to the side wall on which they are mounted that the solenoids protrude to the outside of the wall for servicing and inspection.

* * * * *